United States Patent
Ikeda et al.

(10) Patent No.: US 8,511,831 B2
(45) Date of Patent: Aug. 20, 2013

(54) OPTICAL DEVICE AND PROJECTION-TYPE IMAGE DISPLAY APPARATUS

(75) Inventors: Takashi Ikeda, Higashi-Osaka (JP); Yoshihiro Yokote, Hirakata (JP); Shinya Matsumoto, Hirakata (JP); Keietsu Sato, Hanamaki (JP); Kazutaka Tomite, Hanamaki (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 871 days.

(21) Appl. No.: 11/783,536

(22) Filed: Apr. 10, 2007

(65) Prior Publication Data

US 2007/0258058 A1 Nov. 8, 2007

(30) Foreign Application Priority Data

Apr. 11, 2006 (JP) .................................. 2006-108960

(51) Int. Cl.
*G03B 21/28* (2006.01)
(52) U.S. Cl.
USPC ............... 353/37; 353/98; 353/99; 353/119; 362/559; 362/560; 362/561; 385/133
(58) Field of Classification Search
USPC ............... 353/37, 98, 99, 119; 362/559–561; 385/133
See application file for complete search history.

(56) References Cited

U.S. PATENT DOCUMENTS

| | | | | |
|---|---|---|---|---|
| 6,038,361 | A  * | 3/2000 | Yoshikawa et al. | 385/134 |
| 7,185,985 | B2 * | 3/2007 | Hanano | 353/30 |
| 2004/0041984 | A1 * | 3/2004 | Tani et al. | 353/20 |
| 2004/0057027 | A1 * | 3/2004 | Tani | 353/102 |
| 2004/0062044 | A1 | 4/2004 | Hanano | |
| 2004/0239899 | A1 | 12/2004 | Akiyama | |
| 2006/0232750 | A1 * | 10/2006 | Yokote | 353/20 |
| 2007/0091271 | A1 | 4/2007 | Hanano | |
| 2007/0253080 | A1 * | 11/2007 | Yokote et al. | 359/833 |

FOREIGN PATENT DOCUMENTS

| | | |
|---|---|---|
| CN | 1488989 | 4/2004 |
| CN | 1506748 | 6/2004 |
| EP | 1 396 753 A1 | 3/2004 |
| JP | 2004-93623 A | 3/2004 |
| JP | 2004-102132 A | 4/2004 |
| JP | 2004101895 | 4/2004 |
| JP | 2005-300832 A | 10/2005 |
| JP | 2005-316405 | 11/2005 |

OTHER PUBLICATIONS

English translation of the Chinese Office Action dated Aug. 3, 2010 issued in counterpart application CN 200710091792.8.
Office Action issued on Feb. 21, 2012 in the counterpart Japanese Patent Application Serial No. 2007-103292.

(Continued)

*Primary Examiner* — Georgia Y Epps
*Assistant Examiner* — Kevin Wyatt
(74) *Attorney, Agent, or Firm* — NDQ&M Watchstone LLP

(57) ABSTRACT

An optical device includes a main body having a light incident surface, a light emitting surface provided facing the light incident surface, and a light-reflecting side surface provided from a periphery of the light incident surface to a periphery of the light emitting surface. In the optical device, the light incident surface, the light emitting surface and the light-reflecting side surface are mirror-finished, and a supporting portion configured to support the main body is provided on the light-reflecting side surface.

4 Claims, 7 Drawing Sheets

(56) References Cited

OTHER PUBLICATIONS

English Abstract for JP2004-93623, published Mar. 25, 2004.
English Abstract for JP2004-102132, published Apr. 2, 2004.
English Abstract and Machine Translation for JP2005-300832, published Oct. 27, 2005.
Chinese Official Letter dated Dec. 4, 2009; English translation included.

* cited by examiner

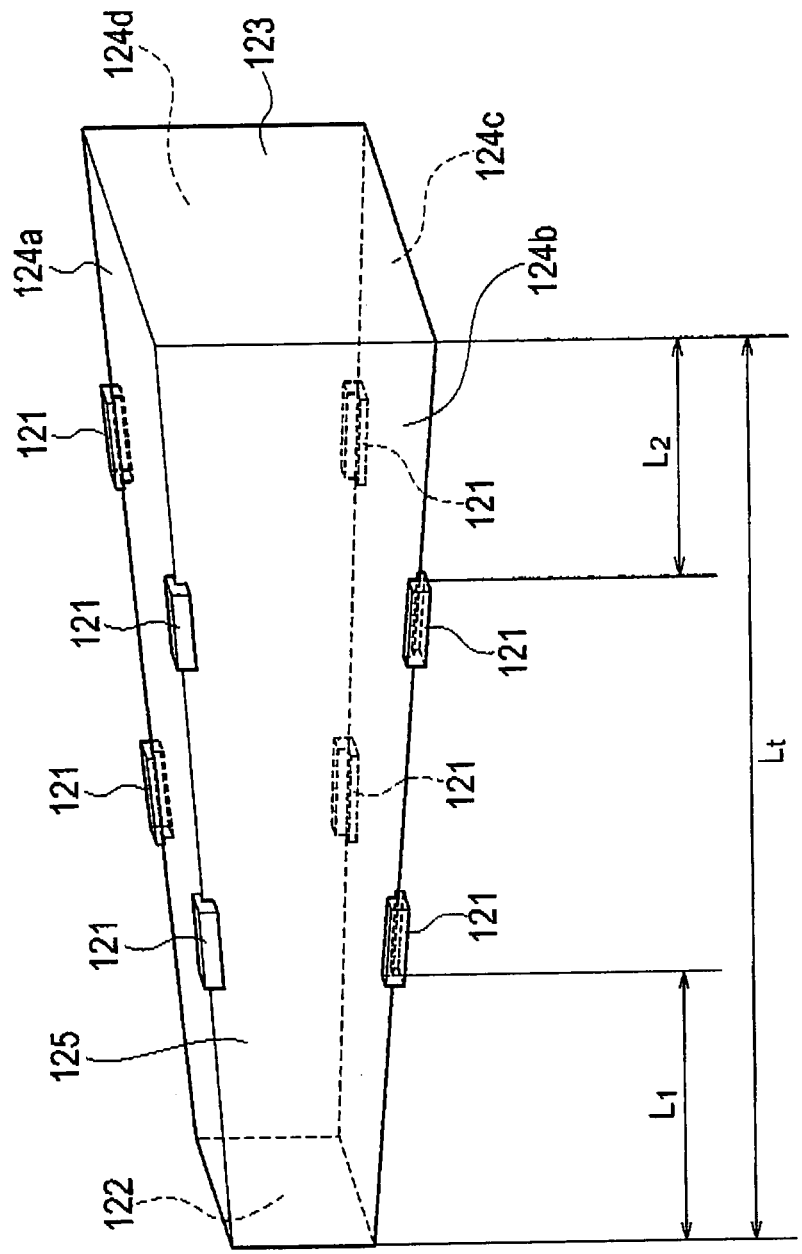

OPTICAL DEVICE AND PROJECTION-TYPE IMAGE DISPLAY APPARATUS

CROSS REFERENCE TO RELATED APPLICATIONS

This application is based upon and claims the benefit of priority from prior Japanese Patent Application No. 2006-108960, filed on Apr. 11, 2006, and prior Japanese Patent Application No. 2007-103292, filed on Apr. 10, 2007; the entire contents of which are incorporated herein by reference.

BACKGROUND OF THE INVENTION

1. Field of the Invention

The present invention relates to an optical device having a light incident surface, a light emitting surface and a light-reflecting side surface, all of which are mirror-finished, and a projection-type image display apparatus including the optical device.

2. Description of the Related Art

A projection-type image display apparatus including a light source, an optical modulation element (for example, a liquid crystal panel), a projection lens and the like has been generally well-known. Moreover, as such a projection-type image display apparatus, a projection-type image display apparatus has also been known which includes an optical device (hereinafter referred to as a rod integrator) for the purpose of uniformizing intensity of light emitted by the light source, and the like.

As such a rod integrator, cited is a rod integrator formed of a hollow rod, and provided with a mirror which is formed on an inner surface of the hollow rod, and which reflects light emitted by a light source (for example, Japanese Patent Publication No. 2005-316405 (Claim 6, [0023], FIG. 3)).

Moreover, another known rod integrator is formed of a glass solid rod, and a surface of the solid rod is mirror-finished. By use of this rod integrator, light emitted by a light source is totally reflected on a side surface of the solid rod. Thus, intensity of the light emitted by the light source can be uniformized while suppressing reduction in efficiency in use of the light emitted by the light source.

Meanwhile, in order to reduce costs for the projection-type image display apparatus, demanded is an optical device (a rod integrator) at low cost than the rod integrator having the mirror provided on the inner surface of the hollow rod, or than the rod integrator formed of the glass solid rod.

Consequently, the inventors have focused attention on an optical device which is formed of a solid rod of transparent resin, and in which a surface of the solid rod is mirror-finished.

However, since the above optical device is formed of the solid rod made of transparent resin, a surface thereof is easily scratched in the processes of manufacturing the projection-type image display apparatus, and the like. Furthermore, when the surface of the optical device is scratched, total reflection of the light emitted by the light source is no longer achieved. Consequently, the efficiency in use of the light emitted by the light source is reduced.

SUMMARY OF THE INVENTION

One aspect of the present invention provides an optical device (a tapered rod 120) including a main body (a main body 125) made of transparent resin which has a light incident surface (a light incident surface 122), a light emitting surface (a light emitting surface 123) provided facing the light incident surface, and a light-reflecting side surface (a light-reflecting side surface 124) provided from a periphery of the light incident surface to a periphery of the light emitting surface. In the optical device, the light incident surface, the light emitting surface and the light-reflecting side surface are mirror-finished. A supporting portion (supporting portions 121) configured to support the main body is provided on the light-reflecting side surface.

According to the aspect described above, since the optical device is made of transparent resin, costs can be lower than a tapered rod made of glass, and the like.

Moreover, since the supporting portion configured to support the main body of the optical device is provided on the light-reflecting side surface, when the optical device is placed on a flat surface, the light-reflecting side surface is not in contact with the flat surface. Specifically, spots prone to be scratched when handling the optical device are limited to the supporting portion. Thus, a possibility that the light-reflecting side surface will be scratched can be lowered. Consequently, reduction in light-use efficiency can be suppressed.

In the above aspect of the present invention, it is preferable that a length from the light emitting surface to the supporting portion be not less than 10% of a length from the light incident surface to the light emitting surface.

In the above aspect of the present invention, it is preferable that a length from any one of surface having smaller area, among the light incident surface and the light emitting surface, to the supporting portion be not less than 10% of the length from the light incident surface to the light emitting surface.

In the above aspect of the present invention, it is preferable that the main body and the supporting portion be made of the same transparent resin.

One aspect of the present invention provides a projection-type image display apparatus which has a light source, an optical modulation element and a projection lens enlarging an image displayed on the optical modulation element. The projection-type image display apparatus includes an optical device configured to uniformize intensity of light emitted by the light source. In the projection-type image display apparatus, the optical device has a main body made of transparent resin and supporting portion configured to support the main body. In addition, the main body has a light incident surface, a light emitting surface provided facing the light incident surface, and a light-reflecting side surface provided from a periphery of the light incident surface to a periphery of the light emitting surface The light incident surface, the light emitting surface and the light-reflecting side surface are mirror-finished. The supporting portion is provided on the light-reflecting side surface.

One aspect of the present invention provides a projection-type image display apparatus which has a light source, an optical modulation element and a projection lens enlarging an image displayed on the optical modulation element. The projection-type image display apparatus includes an optical device configured to reduce a dispersion angle of light emitted by the light source. In the projection-type image display apparatus, the optical device has a main body made of transparent resin and supporting portion configured to support the main body. In addition, the main body has a light incident surface, a light emitting surface provided facing the light incident surface, and a light-reflecting side surface provided from a periphery of the light incident surface to a periphery of the light emitting surface. The light incident surface, the light emitting surface and the light-reflecting side surface are mirror-finished. The supporting portion is provided on the light-reflecting side surface. An area of the light incident surface is smaller than an area of the light emitting surface.

BRIEF DESCRIPTION OF THE DRAWINGS

FIG. 3 is a view showing a tapered rod 120 according to the first embodiment of the present invention.

DETAILED DESCRIPTION OF THE EMBODIMENTS

Figure 1:
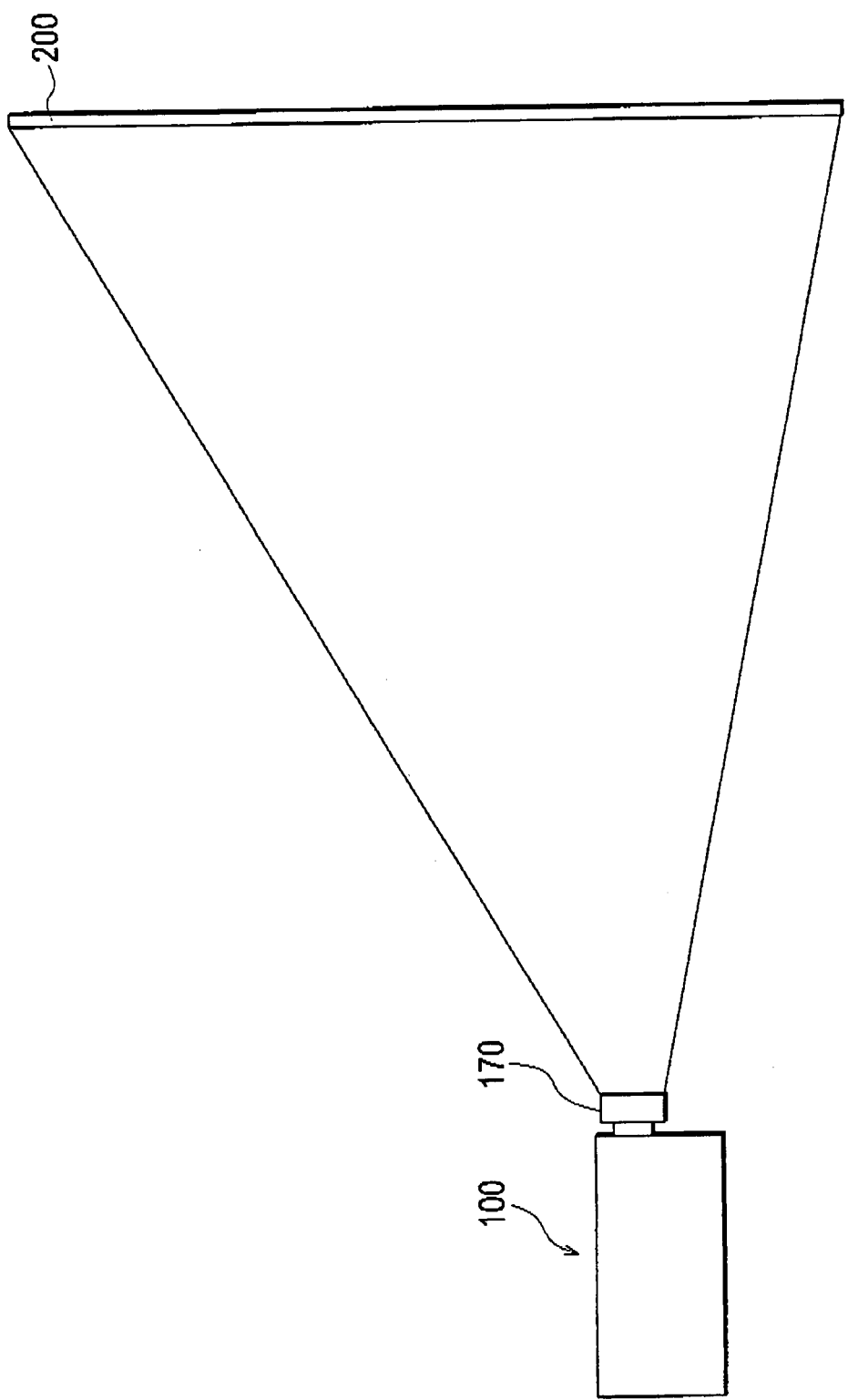
FIG. 1 is a view showing a projection-type image display apparatus 100 according to a first embodiment of the present invention.

With reference to the drawings, embodiments of the present invention will be described below. Note that, in the following description of the drawings, the same or similar parts will be denoted by the same or similar reference numerals.

However, it should be noted that the drawings are conceptual, and that ratios of the respective dimensions and the like are different from actual ones. Hence, specific dimensions and the like should be determined by considering the following description. Moreover, it is needless to say that the drawings also include portions in which dimensional relationships and ratios are different from those of one another.

First Embodiment (Projection-Type Image Display Apparatus)

With reference to the drawings, description will be given below of a projection-type image display apparatus according to a first embodiment of the present invention. FIG. 1 is a view showing a projection-type image display apparatus 100 according to the first embodiment of the present invention.

As shown in FIG. 1, the projection-type image display apparatus 100 has a projection lens 170, and displays an image enlarged by the projection lens 170 on a screen 200.

Incidentally, in the first embodiment, description will be given on the assumption that the projection-type image display apparatus 100 is a three-panel-type projector.

Figure 2:
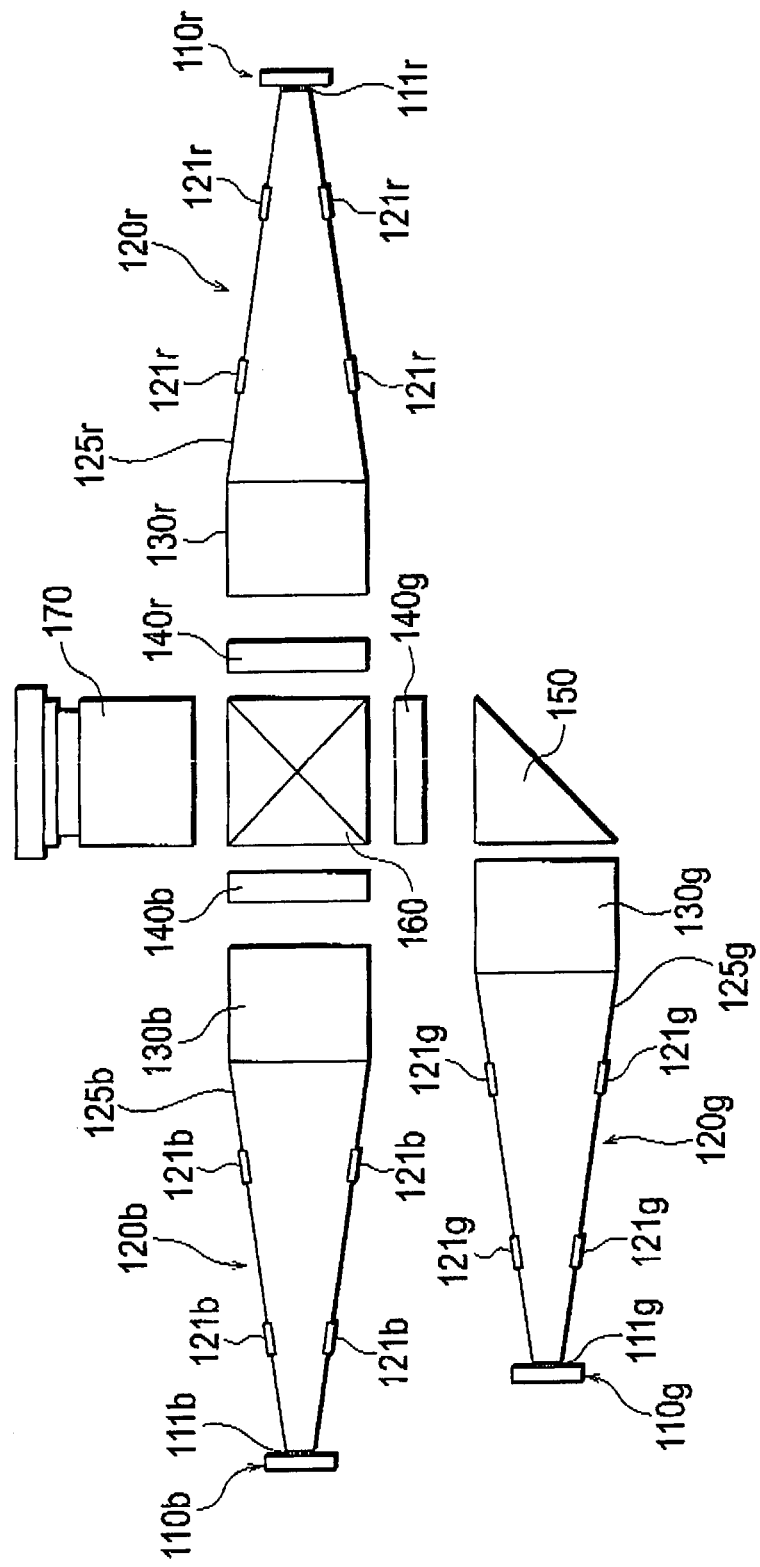
FIG. 2 is a view showing a configuration of the projection-type image display apparatus 100 according to the first embodiment of the present invention.

With reference to the drawings, a configuration of the projection-type image display apparatus will be described below. FIG. 2 is a view showing the configuration of the projection-type image display apparatus 100 according to the first embodiment of the present invention. Note that FIG. 2 shows only the configuration related to the present invention. It is a matter of course that the projection-type image display apparatus 100 may have other optical devices (for example, a relay lens and the like).

As shown in FIG. 2, the projection-type image display apparatus 100 includes a plurality of light sources 110 (light sources 110r, 110g and 110b), a plurality of tapered rods 120 (tapered rods 120r, 120g and 120b), a plurality of light-guide members 130 (light-guide members 130r, 130g and 113b), a plurality of liquid crystal panels 140 (liquid crystal panels 140r, 140g and 140b), a triangular prism 150, a dichroic prism 160 and the projection lens 170.

The light source 110r is a light source that emits red light, and has a red LED 111r. Similarly, the light source 110g is a light source that emits green light, and has a green LED 111g. The light source 110b is a light source that emits blue light, and has a blue LED 111b.

The tapered rod 120r is an optical member which has a tapered shape with a light emitting surface larger than a light incident surface, and reflects the red light emitted from the light source 110r, on side surfaces (hereinafter referred to as light-reflecting side surfaces) of the tapered rod 120r. Moreover, supporting portions 121r supporting a main body 125r of the tapered rod 120r are provided on the light-reflecting side surfaces of the tapered rod 120r.

Similarly, the tapered rod 120g is an optical member which has a tapered shape with a light emitting surface larger than a light incident surface, and reflects the green light emitted from the light source 110g, On side surfaces (hereinafter referred to as light-reflecting side surfaces) of the tapered rod 120g. Moreover, supporting portions 121g supporting a main body 125g of the tapered rod 120g are provided on the light-reflecting side surfaces of the tapered rod 120g.

Furthermore, the tapered rod 120b is an optical member which has a tapered shape with a light emitting surface larger than a light incident surface, and reflects the blue light emitted from the light source 110b, on side surfaces (hereinafter referred to as light-reflecting side surfaces) of the tapered rod 120b. Moreover, supporting portions 121b supporting a main body 125b of the tapered rod 120b are provided on the light-reflecting side surfaces of the tapered rod 120b.

Incidentally, since the tapered rods 120r, 120g and 120b have the same configuration, these tapered rods will be collectively called the tapered rod 120 as appropriate. Similarly, since the supporting portions 121r, 121g and 121b have the same configuration, these parts will be collectively called the supporting portions 121 as appropriate. Furthermore, since the main bodies 125r, 125g and 125b have the same configuration, these parts will be collectively called the main body 125 as appropriate.

Moreover, details on the tapered rod 120 and the supporting portions 121 will be described later (see FIGS. 3 and 4).

The light-guide member 130r is an optical member which guides the red light emitted from the light emitting surface of the tapered rod 120r toward the liquid crystal panel 140r by reflecting the red light on side surfaces of the light-guide member 130r Similarly, the light-guide member 130g is an optical member which guides the green light emitted from the light emitting surface of the tapered rod 120g toward the liquid crystal panel 140g (the triangular prism 150) by reflecting the green light on side surfaces of the light-guide member 130g. Moreover, the light-guide member 130b is an optical member which guides the blue light emitted from the light emitting surface of the tapered rod 120b toward the liquid crystal panel 140b by reflecting the blue light on side surfaces of the light-guide member 130b.

The liquid crystal panel 140r modulates the red light according to a video signal from a drive circuit (not shown), and then emits the light to the dichroic prism 160. Similarly, the liquid crystal panel 140g modulates the green light according to a video signal from a drive circuit (not shown), and then emits the light to the dichroic prism 160. Moreover, the liquid crystal panel 140b modulates the blue light according to a video signal from a drive circuit (not shown), and then emits the light to the dichroic prism 160.

The triangular prism 150 is an optical member which reflects the green light emitted from a light emitting surface of the light-guide member 130g, toward the liquid crystal panel 140g. Note that an air gap is provided between the light emitting surface of the light-guide member 130g and a light incident surface of the triangular prism 150, so as not to interfere total reflection of the green light.

The triangular prism 150 is provided to miniaturize the projection-type image display apparatus 100 by changing an optical path direction of the green light emitted by the light source 110g.

The dichroic prism 160 combines the red light from the liquid crystal panel 140r, the green light from the liquid crystal panel 140g and the blue light from the liquid crystal panel 140b. To be more specific, the dichroic prism 160 reflects the red light from the liquid crystal panel 140r and the blue light from the liquid crystal panel 140b toward the projection lens 170. Meanwhile, the dichroic prism 160 passes through the green light emitted from the liquid crystal panel 140g.

The projection lens 170 enlarges images displayed on the liquid crystal panels 140r, 140g and 140b, and thereby displays the images on the screen 200. To be more specific, the projection lens 170 projects the light combined by the dichroic prism 160 on the screen 200.

(Optical Device)

With reference to the drawings, description will be given below of an optical device (the tapered rod 120) according to the first embodiment of the present invention. FIG. 3 is a view showing the tapered rod 120 according to the first embodiment of the present invention.

As shown in FIG. 3, the main body 125 of the tapered rod 120 is a solid optical device which has a quadrangular tapered shape, and is made of transparent resin. Here, the transparent resin is one having a refractive index larger than that of at least the air. The transparent resin includes acrylic resin such as PMMA (Poly Methyl Meth Acrylate), polycarbonate resin, ZEONEX (registered trademark) and the like.

Moreover, the main body 125 of the tapered rod 120 has a light incident surface 122; a light emitting surface 123 provided so as to face the light incident surface 122; and light-reflecting side surfaces 124 (light-reflecting side surfaces 124a to 124d) which are provided from a periphery of the light incident surface 122 to a periphery of the light emitting surface 123.

The light incident surface 122 is mirror-finished, and is a surface from which light enters. Moreover, the light emitting surface 123 is mirror-finished, and is a surface from which the light is emitted. Furthermore, an area of the light incident surface 122 is smaller than that of the light emitting surface 123.

The mirror finishing is process of forming a mirror surface having profile irregularity that secures micron-level flatness without any scratch or loss of transparency. Specifically, the surface of the tapered rod 120 is turned into the mirror surface by transferring the mirror surface of the mold onto a surface of resin poured into the mold. In a case where the tapered rod is made of glass, the surface of the tapered rod is processed to be the mirror surface by a polishing step of polishing the surface thereof with particles of a minute particle size.

As described above, when the light incident surface 122 and the light emitting surface 123 are mirror-finished, a light quantity loss caused by light reflection is reduced. Moreover, a change in an optical path direction of the light is suppressed on the light incident surface 122 and the light emitting surface 123.

The light-reflecting side surfaces 124 are mirror-finished, and guide the light entered from the light incident surface 122, to the light emitting surface 123 by totally reflecting the light. Moreover, the plurality of supporting portions 121 described above are provided on the light-reflecting side surfaces 124.

As described above, when the light-reflecting side surfaces 124 are mirror-finished, the change in the optical path direction of the light is suppressed on the light-reflecting side surfaces 124.

Incidentally, in the first embodiment, the supporting portions 121 are respectively provided on corner portions where the light-reflecting side surfaces 124a and 124b are in contact with each other, to corner portions where the light-reflecting side surfaces 124b and 124c are in contact with each other to corner portions where the light-reflecting side surfaces 124c and 124d are in contact with each other, and to corner portions where the light-reflecting side surfaces 124d and 124a are in contact with each other.

The supporting portions 121 are each made of the same transparent resin as that of the main body 125 of the tapered rod 120. It is preferable that the supporting portions 121 and the main body 125 are formed by integral molding. The supporting portions 121 are provided on positions where a length $L_1$ from the light incident surface 122 to the supporting portions 121 is set to be 10% or more of a length $L_t$ from the light incident surface 122 to the light emitting surface 123. Furthermore, the supporting portions 121 are provided on positions where a length $L_2$ from the light emitting surface 123 to the supporting portions 121 is set to be 10% or more of the length $L_t$ from the light incident surface 122 to the light emitting surface 123.

The tapered rod 120 having the configuration as described above has a function of uniformizing intensity of light entered from the light incident surface 122 on the light emitting surface 123, in a case where the incident light has a variation in intensity. Moreover, as described above, the tapered rod 120 has a tapered shape in which the area of the light-incident surface 122 is smaller than that of the light emitting surface 123. Thus, the tapered rod 120 also has a function of reducing a dispersion angle of the light entered from the light incident surface 122.

Figure 4A:
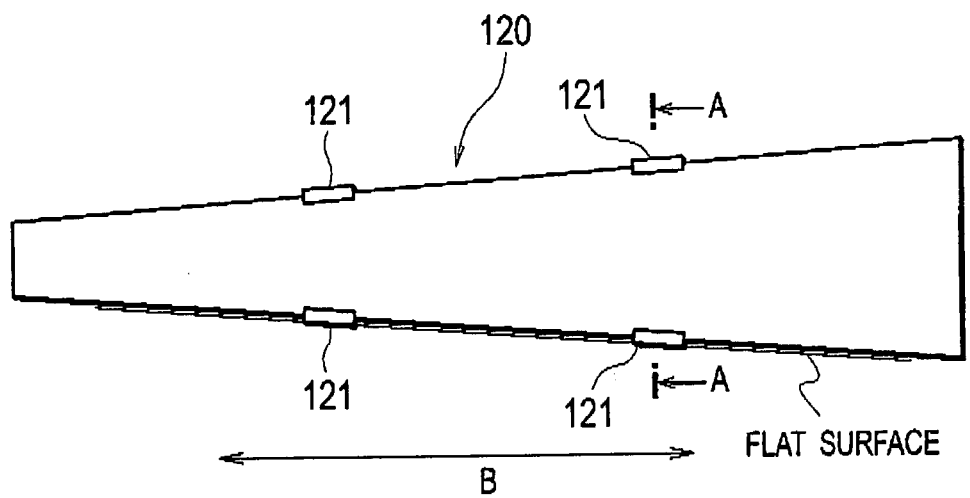
FIGS. 4A and 4B are views each showing the tapered rod 120 according to the first embodiment of the present invention.

With reference to the drawings, the optical device (the tapered rod 120) according to the first embodiment of the present invention will be described more detail. FIG. 4A is a side view of the tapered rod 120 according to the first embodiment of the present invention. FIG. 48 is a view of the tapered rod 120 according to the first embodiment of the present invention, as viewed from a direction A shown in FIG. 4A.

As shown in FIG. 4A, when the tapered rod 120 is placed on a flat surface a, the main body 125 of the tapered rod 120 is supported by the supporting portions 121, and the light-reflecting side surfaces 124 are not in contact with the flat surface a.

Here, a shape, positions and the number of the supporting portions 121 are not particularly limited as long as the light-reflecting side surfaces 124 do not come into contact with the flat surface a. To be more specific, the shape, positions and the number of the supporting portions 121 are determined according to a length of the tapered rod 120 in a direction B, and the like. For example, when each of the supporting portions 121 has a small shape, it is preferable that the number of the supporting portions 121 be two or more, and that the supporting portions 121 be disposed so as to be sufficiently spaced apart from each other. Moreover, when each of the supporting portions 121 has a large shape, it is preferable that the number of the supporting portions 121 be one, and that the supporting portion 121 be disposed in the substantially-central portion of the tapered rod 120 in the direction B.

Furthermore, in order not to interfere total reflection of the light entered from the light incident surface 122, it is preferable that portions where the supporting portions 121 are in contact with the light-reflecting side surfaces 124 in the direction B have small areas.

Figure 4B:
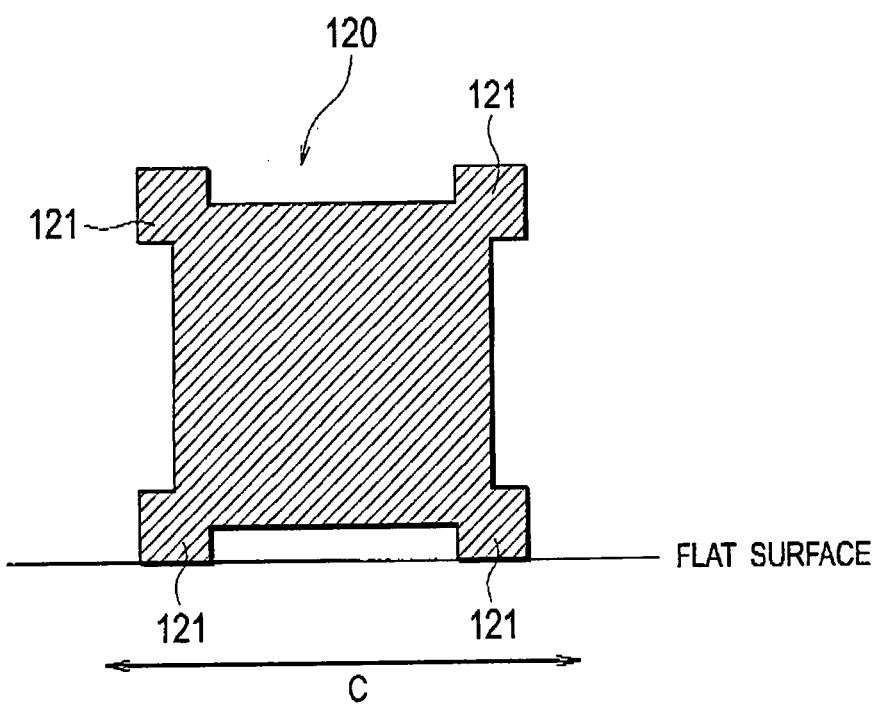

As shown in FIG. 4B, when the tapered rod 120 is placed on the flat surface a, the main body 125 of the tapered rod 120 is supported by the supporting portions 121, and the light-reflecting side surfaces 124 are not in contact with the flat surface a. Moreover, the main body 125 and the supporting portions 121 are integrally molded.

Here, as in the case shown in FIG. 4A, the shape, positions and the number of the supporting portions 121 are not particularly limited as long as the light-reflecting side surfaces 124 do not come into contact with the flat surface a. To be more specific, the shape, positions and the number of the supporting portions 121 are determined according to a length of the tapered rod 120 in a direction C, and the like. For example, when each of the supporting portions 121 has a small shape, it is preferable that the number of the supporting portions 121 be two or more, and that the respective supporting portions 121 be disposed so as to be sufficiently spaced apart from one another. Moreover, when each of the supporting portions 121 has a large shape, it is preferable that the number of the supporting portions 121 be one, and that the supporting portion 121 be disposed in the substantially-central portion of the tapered rod 120 in the direction C.

Furthermore, as in the case shown in FIG. 4A, in order not to interfere the total reflection of the light entered from the light incident surface 122, it is preferable that portions where the supporting portions 121 are in contact with the light-reflecting side surfaces 124 in the direction C are small.

(Effects)

According to the tapered rod 120 in the first embodiment of the present invention, since the tapered rod 120 is made of transparent resin, costs can be lowered as compared with such a tapered rod that is made of glass for which a polishing process is needed for forming a surface into a mirror surface.

Moreover, since the supporting portions 121 that support the main body 125 of the tapered rod 120 are provided on the light-reflecting side surfaces 124, the light-reflecting side surfaces 124 are not in contact with the flat surface a when the tapered rod 120 is placed on the flat surface a. Specifically, spots prone to be scratched in the processes of manufacturing the projection-type image display apparatus 100 and the like are limited to the supporting portions 121. Thus, a possibility that the light-reflecting side surfaces 124 would be scratched can be lowered. Consequently, reduction in light-use efficiency can be suppressed.

In addition, according to the tapered rod 120 in the first embodiment of the present invention, since the length $L_2$ from the light emitting surface 123 to the supporting portions 121 is 10% or more of the length $L_t$ from the light incident surface 122 to the light emitting surface 123, the total reflection of the light entered from the light incident surface 122 is not interfered by the supporting portions 121 in the vicinity of the light emitting surface 123. Thus, it is possible to suppress deterioration of uniformity in light intensity and reduction in the light use efficiency caused by the supporting portions 121 provided near the light emitting surface 123.

To be more specific, if the supporting portions 121 are provided near the light emitting surface 123, light made non-uniform by the supporting portions 121 is emitted as it is from the light emitting surface 123.

On the other band, if the supporting portions 121 are not provided near the light emitting surface 123, the light, of which uniformization is inhibited by the supporting portions 121, is uniformized again before reaching the light emitting surface 123. Hence, according to the first embodiment of the present invention, it is possible to suppress deterioration of uniformity in light intensity and reduction in the light-use efficiency.

Furthermore, according to the tapered rod 120 in the first embodiment of the present invention, since the length $L_1$ from the light incident surface 122 to the supporting portions 121 is 10% or more of the length $L_t$ from the light incident surface 122 to the light emitting surface 123, the total reflection of the light entered from the light incident surface 122 is not interfered by the supporting portions 121 in the vicinity of the light incident surface 122. Accordingly, it is possible to minimize an adverse effect that the light use efficiency is reduced by the supporting portions 121.

To be more specific, the larger the quantity of light passing the supporting portions 121, the more the light-quantity loss is increased. For this reason, the larger the proportion of the supporting portions 121 in the cross-section of the tapered rod 120 shown in FIG. 4B, the more the light-quantity loss is increased. Specifically, in the first embodiment, the area of the light incident surface 122 is smaller than that of the light emitting surface 123. As a result, the supporting portions 121 of the same size provided closer to the light incident surface 122 increases the adverse effect that the light use efficiency is reduced by the supporting portions 121.

In contrast, according to the first embodiment of the present invention, since the supporting portions 121 are not provided near the light incident surface 122, the adverse effect that the light-use efficiency is reduced by the supporting portions 121 can be minimized.

Moreover, although a light dispersion angle is large near the light incident surface 122, the light dispersion angle is reduced with distance from the light incident surface 122. Thus, an adverse effect that the supporting portions 121 have on reduction in the light dispersion angle can be reduced by not providing the supporting portions 121 near the light incident surface 122.

Moreover, in the tapered rod 120 according to the first embodiment of the present invention, the supporting portions 121 are provided on the corner portions where the light-reflecting side surfaces 124 are in contact with each other. Thus, reduction in the light-use efficiency due to provision of the supporting portions 121 can be suppressed, as compared with a case where the supporting portions 121 are provided on portions other than the corner portions.

Furthermore, since the light source 110 is formed of a LED, the amount of heat generated by the light source 110 is less than that generated by a light source formed of a high-pressure mercury lamp. Hence, even if the tapered rod 120 according to the first embodiment of the present invention is disposed near the light source 110, deterioration of the tapered rod 120 made of transparent resin can be suppressed.

Second Embodiment

With reference to the drawings, description will be given below of an optical device (a tapered rod 120) according to a second embodiment of the present invention. Note that differences between the first embodiment described above and the second embodiment will be mainly described below.

Specifically, in the first embodiment described above, the main body 125 of the tapered rod 120 has the quadrangular tapered shape. On the other hand, in the second embodiment, a main body 125 of the tapered rod 120 has a cylindrical tapered shape.

Figure 5:
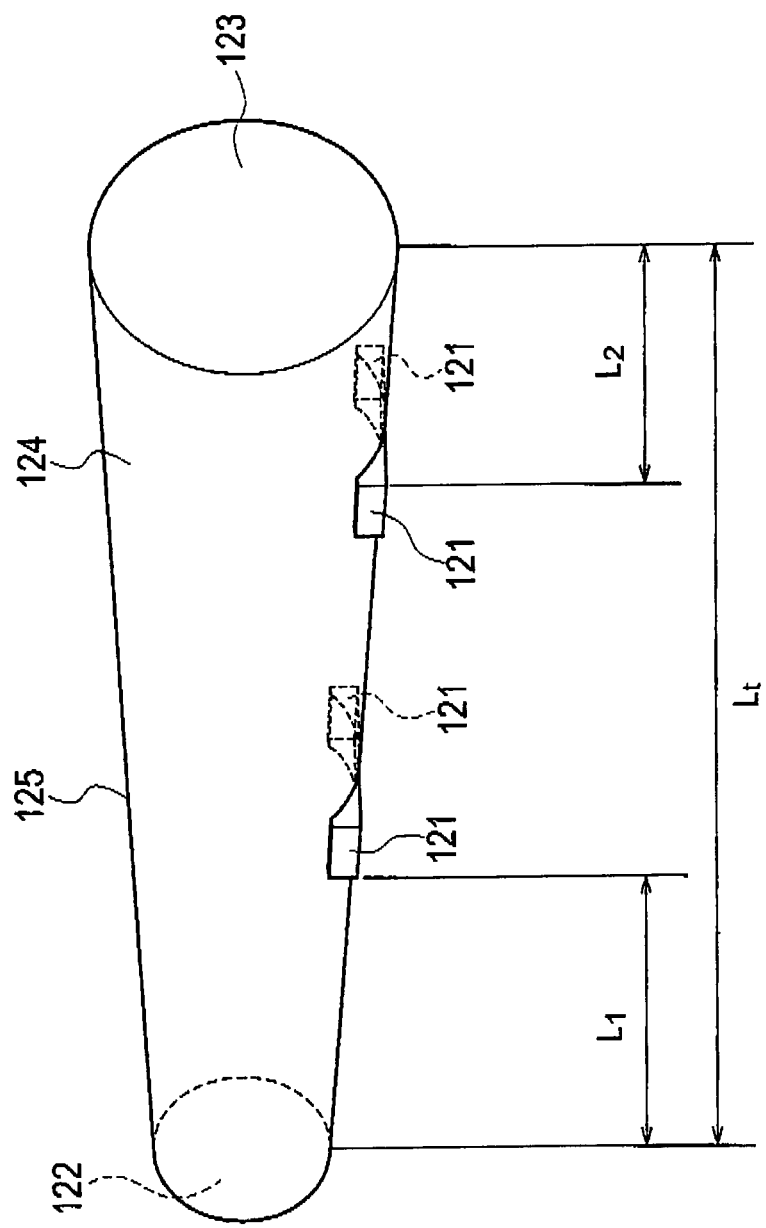
FIG. 5 is a view showing a tapered rod 120 according to a second embodiment of the present invention.

FIG. 5 is a view showing the tapered rod 120 according to the second embodiment of the present invention. As shown in FIG. 5, the main body 125 of the tapered rod 120 has the cylindrical tapered shape, and is made of transparent resin. Here, as described above, the transparent resin is one having a refractive index larger than that of at least the air. The transparent resin includes acrylic resin such as PMMA (Poly Methyl Meth Acrylate), polycarbonate resin, ZEONEX (registered trademark) and the like.

Moreover, as in the case of the first embodiment, the main body 125 of the tapered rod 120 has a light incident surface 122, a light emitting surface 123 and a light-reflecting side surface 124 provided from a periphery of the light incident surface 122 to a periphery of the light emitting surface 123.

The light-reflecting side surface 124 is mirror-finished, and guides light entered from the light incident surface 122 toward the light emitting surface 123 by totally reflecting the light. Moreover, a plurality of supporting portions 121 are provided on the light-reflecting side surface 124.

The supporting portions 121 are made of the same transparent resin as that of the main body 125 of the tapered rod 120. Moreover, the supporting portions 121 are provided on positions where a length $L_1$ from the light incident surface 122 to the supporting portion 121 is set to be 10% or more of a length $L_t$ from the light incident surface 122 to the light emitting surface 123. Furthermore, the supporting portions 121 are provided on positions where a length $L_2$ from the light emitting surface 123 to the supporting portion 121 is set to be 10% or more of the length $L_t$ from the light incident surface 122 to the light emitting surface 123.

Incidentally, as in the case of the first embodiment described above, a shape, positions and the number of the supporting portions 121 are not particularly limited as long as the light-reflecting side surface 124 does not come into contact with a flat surface a.

Other Embodiments

The present invention has been described according to the above embodiments. However, it should be understood that the present invention is not limited to the description and drawings which constitute a part of this disclosure. From this disclosure, various alternative embodiments, examples and operational technologies will become apparent to those skilled in the art.

For example, although the main body 125 of the tapered rod 120 has the quadrangular or cylindrical shape in the embodiments described above, the shape of the main body 125 is not limited thereto. The main body 125 may have a polygonal prismatic shape.

Moreover, although the main body 125 of the tapered rod 120 has the tapered shape in which the area of the light incident surface 122 is smaller than that of the light emitting surface 123 in the embodiments described above, the shape of the main body 125 is not limited thereto. The main body 125 may have a reverse tapered shape in which the area of the light emitting surface 123 is smaller than that of the light incident surface 122.

Furthermore, although the projection-type image display apparatus 100 includes the light-guide members 130 in the embodiments described above, the configuration of the apparatus is not limited thereto. The projection-type image display apparatus 100 does not have to include the light-guide members 130.

The shapes of the light incident surface 122 and of the light emitting surface 123 may be similar or not similar to each other.

Surfaces of the supporting portions 121 may be mirror-finished.

Although the liquid crystal panels 140 are used as optical modulation elements in the embodiments described above, the optical modulation elements are not limited thereto. As the optical modulation element, a DMD (Digital Micro Mirror Device) or a reflection-type liquid crystal panel may be used. Moreover, a single optical modulation element may be used. Furthermore, the projection-type image display apparatus 100 may be a rear-projection-type display apparatus.

The light sources 110 may have LED arrays in each of which a plurality of LEDs are arranged.

EXAMPLES

Figure 6:
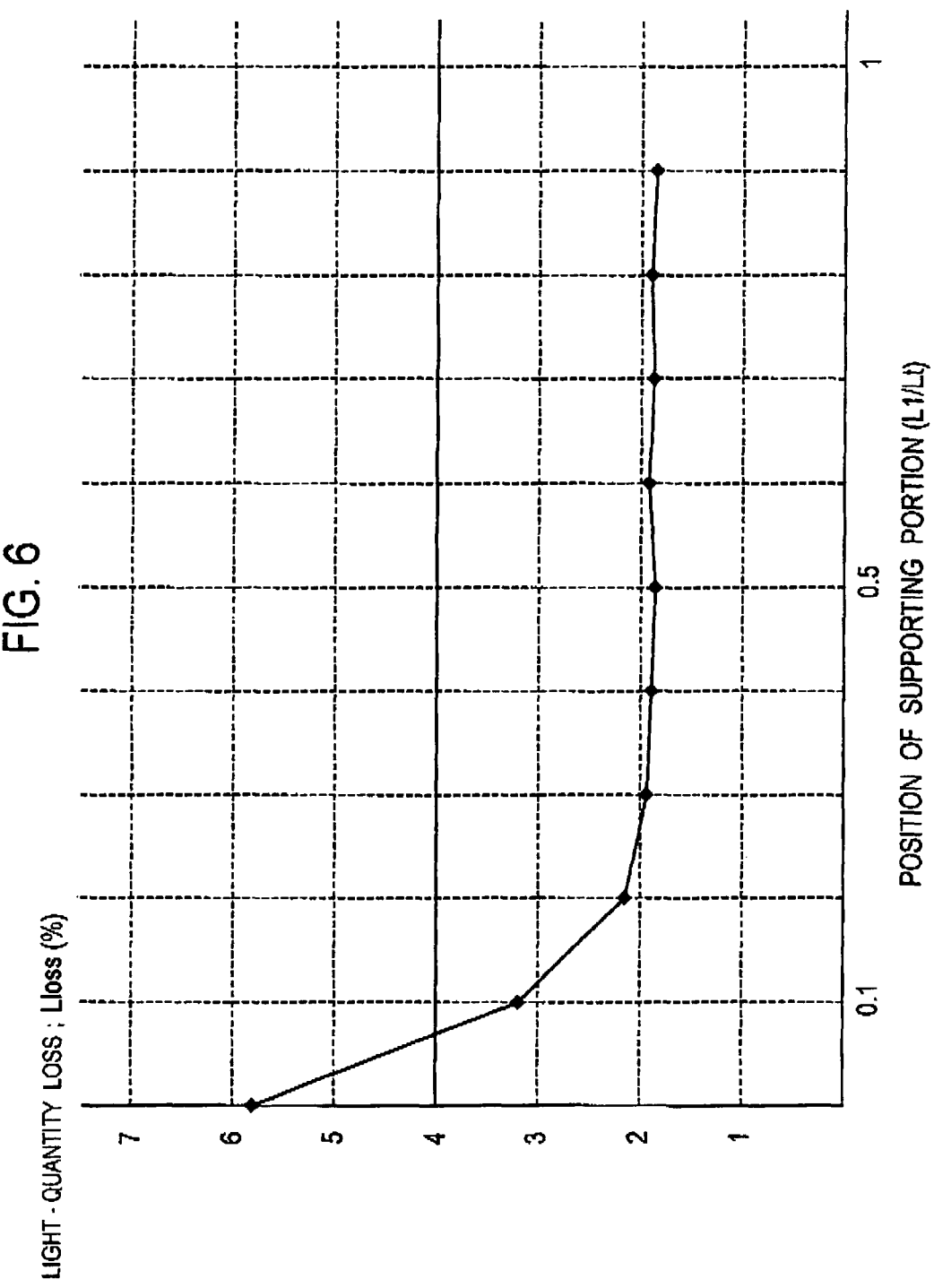
FIG. 6 is a graph showing a relationship between a position of a supporting portion 121 and a light-quantity loss in one example of the present invention.
Figure 7:
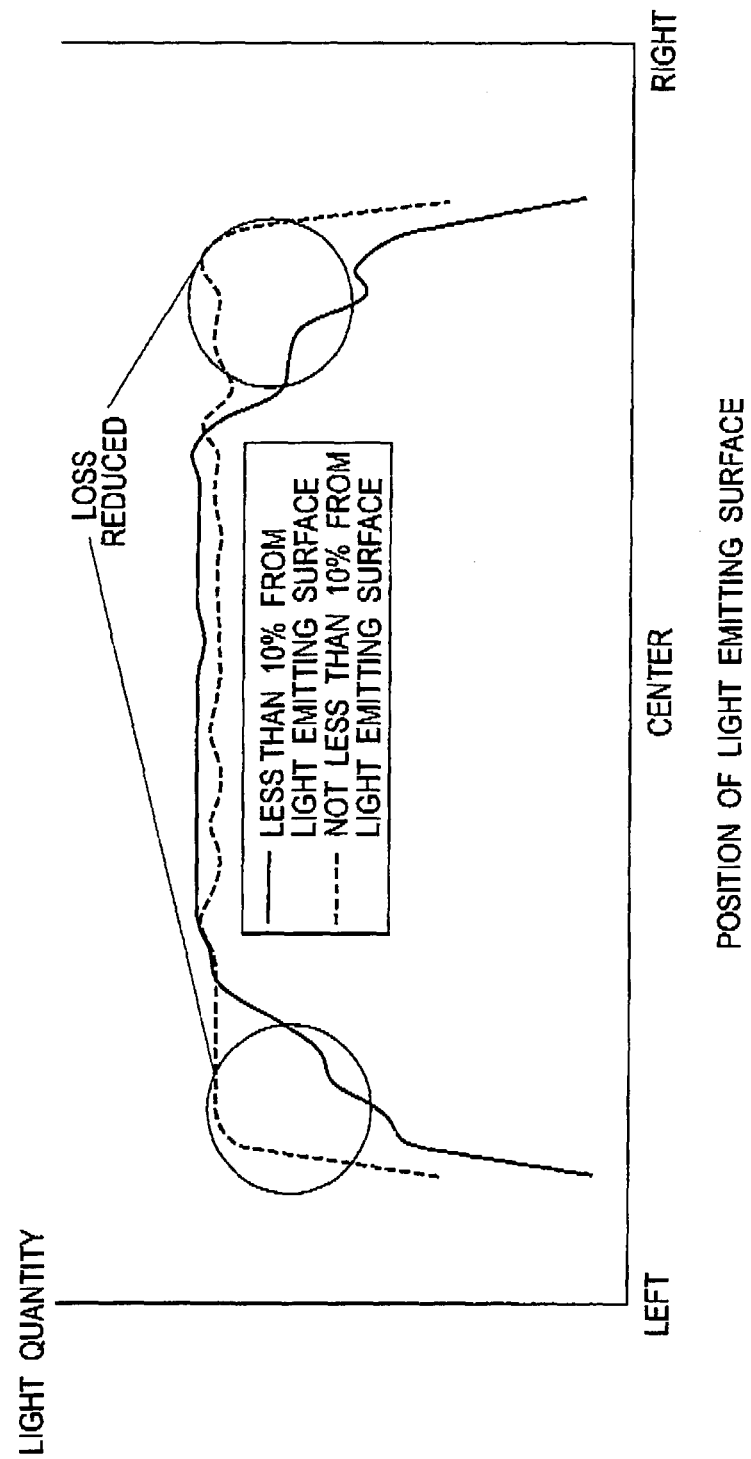
FIG. 7 is a graph showing a relationship between the position of the supporting portion 121 and a light quantity on a light emitting surface 123 in one example of the present invention.

With reference to the drawings, an example of the present invention will be described below. FIG. 6 is a graph showing a relationship between a position of a supporting portion 121 on a light incident surface 122 side and a light-quantity loss in one example of the present invention. FIG. 7 is a graph showing a relationship between the position of the supporting portion 121 on a light emitting surface 123 side and a light quantity on a light emitting surface 123 in one example of the present invention.

To be more specific, as described in the first embodiment, a main body 125 of a tapered rod 120 was prepared. Here, the main body 125 has a quadrangular tapered shape. Also formed was the tapered rod 120 in which a length $L_1$ from a light incident surface 122 to the supporting portion 121 is changed. Note that the supporting portions 121 were respectively provided on four ridge lines on which light-reflecting side surfaces 124 are in contact with each other.

First, the relationship between the position of the supporting portion 121 on the light incident surface 122 side and the light-quantity loss will be described. In FIG. 6, the horizontal axis indicates the position of the supporting portion 121, that is, the length from the light incident surface 122 to the supporting portion 121/a length from the light incident surface 122 to a light emitting surface 123 ($L_1/L_t$). Moreover, the vertical axis indicates a light-quantity loss (Lloss) of the entire tapered rod 120.

Note that the light-quantity loss (Lloss) caused by providing the supporting portions 121 cannot be eliminated. For this reason, in this example, the light-quantity loss (Lloss) caused by providing one supporting portion 121 was allowed up to 1%.

As shown in FIG. 6, when the position of the supporting portion 121 ($L_1/L_t$) was less than 0.1, it was confirmed that the total light quantity loss caused by providing the four supporting portions 121 was 4% or more. In contrast, when the position of the supporting portion 121 ($L_1/L_t$) was 0.1 or more, it was confirmed that the total light-quantity loss caused by providing the four supporting portions 121 was less than 4%.

As described above, it was confirmed that the light-quantity loss of the entire tapered rod 120 can be suppressed within the allowable range by setting the position of the supporting portion 121 ($L_1/L_t$) at 0.1 or more.

Next, the relationship between the position of the supporting portion 121 on the light emitting surface 123 side ($L_2/L_t$) and the light quantity on the light emitting surface 123 will be described. In FIG. 7, the horizontal axis indicates a position of the light emitting surface 123 in a side-to-side direction, and the vertical axis indicates a light quantity at the position of the light emitting surface 123 in the side-to-side direction.

As shown in FIG. 7, when the length ($L_2$) from the light emitting surface 123 to the supporting portion 121 on the light emitting surface 123 side was less than 10% of the length ($L_1$) from the light incident surface 122 to the light emitting surface 123, it was confirmed that the light quantity was reduced at both right and left edges of the light emitting surface 123.

Meanwhile, when the length ($L_2$) from the light emitting surface 123 to the supporting portion 121 on the light emitting surface 123 side was 10% or more of the length ($L_t$) from the light incident surface 122 to the light emitting surface 123, it was confirmed that the light quantity was not reduced at both right and left edges of the light emitting surface 123.

As described above, it was confirmed that the light-quantity loss was reduced by setting the length ($L_2$) from the light incident surface 122 to the supporting portion 121 on the light emitting surface 123 side to be 10% or more of the length ($L_t$) from the light incident surface 122 to the light emitting surface 123.

What is claimed is:

1. An optical device comprising:
   a main body made of transparent resin, which has a light incident surface, a light emitting surface facing the light incident surface, and a light-reflecting side surface provided from a periphery of the light incident surface to a periphery of the light emitting surface, wherein,
   the light incident surface, the light emitting surface and the light-reflecting side surface are mirror-finished, and
   a pair of supporting portions configured to support the main body, each of the supporting portions provided on the light-reflecting side surface of the main body such that one of the supporting portions is disposed proximate the light incident surface and another is disposed proximate the light emitting surface,
   wherein a length from the light emitting surface to the supporting portion proximate the light emitting surface is not less than 10% of a length of the main body from the light incident surface to the light emitting surface and a length from the light incident surface to the supporting portion proximate the light incident surface is not less than 10% of the length of the main body from the light incident surface to the light emitting surface, and
   wherein the supporting portions and the main body are formed in a single-piece, and made of a same transparent resin.

2. The optical device according to claim 1, wherein a length from any one of surface having smaller area, among the light incident surface and the light emitting surface, to the supporting portion proximate the surface having the smaller area is not less than 10% of a length from the light incident surface to the light emitting surface.

3. A projection-type image display apparatus including a light source, an optical modulation element and a projection lens which enlarges an image displayed on the optical modulation element, comprising,
   an optical device configured to uniformize intensity of light emitted by the light source, wherein,
   the optical device has a main body made of transparent resin and a pair of supporting portions made from the transparent resin and configured to support the main body, and
   the main body has a light incident surface, a light emitting surface provided facing the light incident surface, and a light-reflecting side surface provided from a periphery of the light incident surface to a periphery of the light emitting surface,
   the light incident surface, the light emitting surface and the light-reflecting side surface are mirror-finished, and
   the pair of supporting portions are provided on the light-reflecting side surface of the main body such that one of the supporting portions is disposed proximate the light incident surface and another is disposed proximate the light emitting surface,
   wherein a length from the light emitting surface to the supporting portion proximate the light emitting surface is not less than 10% of a length from the light incident surface to the light emitting surface and a length from the light incident surface to the supporting portion proximate the light incident surface is not less than 10% of the length of the main body from the light incident surface to the light emitting surface, and
   wherein the supporting portions and the main body are formed in a single-piece, and made of a same transparent resin.

4. A projection-type image display apparatus including a light source, an optical modulation element and a projection lens which enlarges an image displayed on the optical modulation element, comprising,
   an optical device configured to reduce a dispersion angle of light emitted by the light source, wherein,
   the optical device has a main body made of transparent resin and a pair of supporting portions made of the transparent resin configured to support the main body,
   the main body has a light incident surface, a light emitting surface provided facing the light incident surface, and a light-reflecting side surface provided from a periphery of the light incident surface to a periphery of the light emitting surface,
   the light incident surface, the light emitting surface and the light-reflecting side surface are mirror-finished,
   the pair of supporting portions are provided on the light-reflecting side surface of the main body such that one of the supporting portions is disposed proximate the light incident surface and another is disposed proximate the light emitting surface, and
   an area of the light incident surface is smaller than an area of the light emitting surface,
   wherein a length from the light emitting surface to the supporting portion proximate the light emitting surface is not less than 10% of a length from the light incident surface to the light emitting surface and a length from the light incident surface to the supporting portion proximate the light incident surface is not less than 10% of the length of the main body from the light incident surface to the light emitting surface, and
   wherein the supporting portions and the main body are formed in a single-piece, and made of a same transparent resin.

* * * * *

UNITED STATES PATENT AND TRADEMARK OFFICE
CERTIFICATE OF CORRECTION

| | |
|---|---|
| PATENT NO. | : 8,511,831 B2 |
| APPLICATION NO. | : 11/783536 |
| DATED | : January 1, 2013 |
| INVENTOR(S) | : Takashi Ikeda et al. |

It is certified that error appears in the above-identified patent and that said Letters Patent is hereby corrected as shown below:

On the Title Page, Item (73) Assignees should read as follows:

-- Sanyo Electric Co., Ltd.
Osaka, Japan

Ricoh Optical Industries Co., Ltd.
Iwate, Japan --.

Signed and Sealed this
Twenty-ninth Day of April, 2014

Michelle K. Lee
*Deputy Director of the United States Patent and Trademark Office*